United States Patent
Hsieh

(10) Patent No.: US 12,219,591 B2
(45) Date of Patent: Feb. 4, 2025

(54) METHOD AND USER EQUIPMENT FOR SCHEDULING WITH MULTIPLE CELLS

(71) Applicant: MEDIATEK INC., Hsin-Chu (TW)

(72) Inventor: Chi-Hsuan Hsieh, Hsin-Chu (TW)

(73) Assignee: MediaTek, Inc., Hsinchu (TW)

( * ) Notice: Subject to any disclaimer, the term of this patent is extended or adjusted under 35 U.S.C. 154(b) by 477 days.

(21) Appl. No.: 17/718,289

(22) Filed: Apr. 11, 2022

(65) Prior Publication Data

US 2022/0369323 A1    Nov. 17, 2022

Related U.S. Application Data

(60) Provisional application No. 63/186,859, filed on May 11, 2021.

(51) Int. Cl.
*H04W 72/542* (2023.01)
*H04L 27/26* (2006.01)
*H04W 72/0446* (2023.01)
*H04W 72/1263* (2023.01)
*H04W 72/23* (2023.01)

(52) U.S. Cl.
CPC ..... *H04W 72/542* (2023.01); *H04L 27/26025* (2021.01); *H04W 72/0446* (2013.01); *H04W 72/1263* (2013.01); *H04W 72/23* (2023.01)

(58) Field of Classification Search
CPC ............... H04W 72/542; H04W 72/23; H04W 72/0446; H04L 27/26025

USPC .......................................................... 370/329
See application file for complete search history.

(56) References Cited

U.S. PATENT DOCUMENTS

| | | | |
|---|---|---|---|
| 2021/0050976 A1* | 2/2021 | Noh | H04L 5/0051 |
| 2024/0008024 A1* | 1/2024 | Jung | H04L 1/1812 |
| 2024/0224210 A1* | 7/2024 | Guo | H04W 76/20 |
| 2024/0235761 A1* | 7/2024 | Yang | H04L 5/0091 |

OTHER PUBLICATIONS

Taiwan IPO, office action for the Taiwanese patent application 111117621 (no English translation is available), dated Jan. 3, 2023 (11 pages).
3GPP TS 38.214 V16.5.0, "3rd Generation Partnership Project; Technical Specification Group Radio Access Network; NR; Physical layer procedures for data (Release 16)", sections 5.1.2.1, 5.1.3, 5.1.5, 5.2.1.5.1, 5.2.1.5.1a, 5.3, 6.1.2.1, dated Mar. 2021 (170 pages).

* cited by examiner

*Primary Examiner* — Hermon Asres
(74) *Attorney, Agent, or Firm* — Helen Mao; Zheng Jin; Imperium Patent Works

(57) ABSTRACT

Method and user equipment (UE) are provided for scheduling with multiple cells. In particular, a UE can connect to a plurality of cells in a network. The UE can determine a specific slot for receiving a CSI-RS from a first cell. An index of the specific slot is n+X+L while n is an index of a slot for receiving a DCI from a second cell, X is a slot offset for triggering the CSI-RS and L includes parameters associated with SCSs of the first cell and the second cell. The UE can receive the CSI-RS from the first cell in the specific slot.

16 Claims, 4 Drawing Sheets

| Cell 121a having SCS of 120kHz | SLOT #0 | SLOT #1 | SLOT #2 | SLOT #3 | |

| Cell 121b having SCS of 30kHz for PDCCH | | SLOT #0 DCI |

| Cell 121c having SCS of 30kHz for CSI-RS | SLOT #0 CSI-RS | |

FIG. 3

METHOD AND USER EQUIPMENT FOR SCHEDULING WITH MULTIPLE CELLS

CROSS REFERENCE TO RELATED APPLICATIONS

This application claims priority under 35 U.S.C. § 119 from U.S. Provisional Application No. 63/186,859, entitled "On UE transmission/receiving behaviors for CA with non-aligned frame boundaries," filed on May 11, 2021, the subject matter of which is incorporated herein by reference.

TECHNICAL FIELD

The disclosed embodiments relate generally to wireless communication, and, more particularly, to method and user equipment for scheduling with multiple cells.

BACKGROUND

In conventional network of 3rd generation partnership project (3GPP) 5G new radio (NR), a channel state information-reference signal (CSI-RS) (e.g., an aperiodic CSI-RS) is transmitted in a specific slot (i.e., slot $K_s$ defined in 3GPP Technical Specification).

Further, in conventional network of 3GPP 5G NR, a CSI reference resource is introduced for a user equipment (UE) to report a CSI report only if receiving at least one CSI-RS transmission occasion for channel measurement and CSI-RS and/or CSI-IM occasion for interference measurement in discontinuous reception (DRX) active time no later than CSI reference resource and drops the report otherwise.

However, based on the conventional determinations of the specific slot (i.e., slot $K_s$) and the CSI reference resource, the results may be wrong when carrier aggregation (CA) slot offset is introduced in the network with multiple cells.

SUMMARY

Method and user equipment (UE) are provided for scheduling with multiple cells. In some embodiments, a UE can connect to a plurality of cells in a network. The UE can determine a specific slot for receiving a channel state information reference signal (CSI-RS) from a first cell of the plurality cells. An index of the specific slot is n+X+L while n is an index of a slot for receiving a downlink control information (DCI) from a second cell of the plurality of cells, X is a slot offset for triggering the CSI-RS and L includes parameters associated with sub-carrier spaces (SCSs) of the first cell and the second cell. The UE can receive the CSI-RS from the first cell in the specific slot.

In some embodiments, a UE can connect to a plurality of cells in a network. The UE can receive a DCI from a first cell of the plurality cells. The DCI indicates the UE to transmit a CSI reporting in an uplink slot n' in a second cell of the plurality cells. The UE can determine a CSI reference resource for the CSI reporting according to a downlink slot $(n-n_{CSI\_ref})$. $n_{CSI\_ref}$ is an index of a slot for CSI reference, and n is $$\left\lfloor n' \cdot \frac{2^{\mu_{DL}}}{2^{\mu_{UL}}} \right\rfloor + L$$

while $\mu_{DL}$ is an index of SCS of the first cell, $\mu_{UL}$ is an index of SCS of the second cell and L includes parameters associated with SCSs of the first cell and the second cell.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates one example of slots of the cells with different SCSs in accordance with embodiments of the current invention.

DETAILED DESCRIPTION

Reference will now be made in detail to some embodiments of the invention, examples of which are illustrated in the accompanying drawings.

Figure 1:
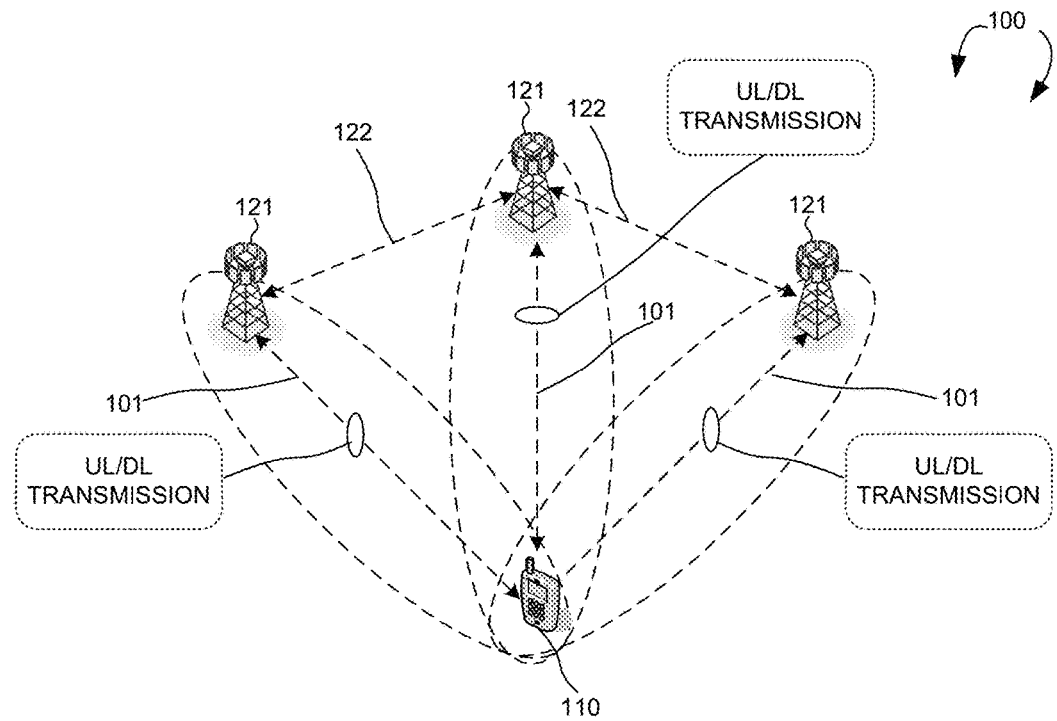
FIG. 1 illustrates an exemplary 5G new radio network supporting scheduling with multiple cells in accordance with embodiments of the current invention.

FIG. 1 illustrates an exemplary 5G new radio (NR) network 100 supporting scheduling with multiple cells in accordance with aspects of the current invention. The 5G NR network 100 includes a user equipment (UE) 110 communicatively connected to a plurality cells 121.

Each cell 121 may provide radio access using a Radio Access Technology (RAT) (e.g., the 5G NR technology). The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

Each cell 121 may provide communication coverage for a geographic coverage area in which communications with the UE 110 is supported via a communication link 101. The communication links 101 shown in the 5G NR network 100 may respectively include uplink (UL) transmissions from the UE 110 to the cells 121 (e.g., on the Physical Uplink Control Channel (PUCCH) or Physical Uplink Shared Channel (PUSCH)) or downlink (DL) transmissions from the cells 121 to the UE 110 (e.g., on the Physical Downlink Control Channel (PDCCH) or Physical Downlink Shared Channel (PDSCH)). The cells 121 may communicate with each other via a communication link 122 between two cells 121.

Figure 2:
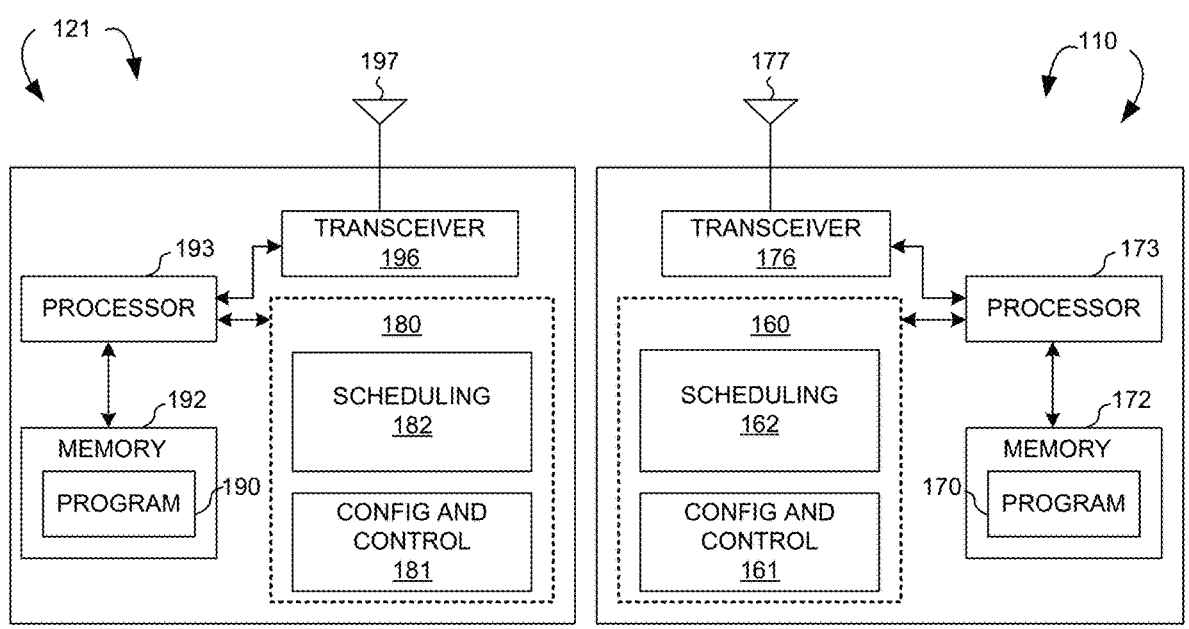
FIG. 2 is a simplified block diagram of the cell and the UE in accordance with embodiments of the current invention.

FIG. 2 is a simplified block diagram of one cell 121 and the UE 110 in accordance with embodiments of the present invention. For the cell 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the cell 121. Memory 192 stores program instructions and data 190 to control the operations of the cell 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The cell 121 and the UE 110 also include several functional modules and circuits that can be implemented and configured to perform embodiments of the present invention. In the example of FIG. 2, the cell 121 includes a set of control functional modules and circuit 180. Scheduling circuit 182 handles scheduling with multiple cells and associated network parameters for the UE 110. Configuration and control circuit 181 provides different parameters to configure and control the UE 110. The UE 110 includes a set of control functional modules and circuit 160. Scheduling circuit 162 handles scheduling with multiple cells and associated network parameters. Configuration and control circuit 161 handles configuration and control parameters from the cells 121.

Note that the different functional modules and circuits can be implemented and configured by software, firmware, hardware, and any combination thereof. The function modules and circuits, when executed by the processors 193 and 173 (e.g., via executing program codes 190 and 170), allow the cells 121 and the UE 110 to perform embodiments of the present invention.

In some embodiments, the UE 110 may connect to the cells 121. After connecting to the cells 121, the UE 110 may determine a specific slot for receiving a channel state information reference signal (CSI-RS) from a first cell of the cells 121. An index of the specific slot is n+X+L while n is an index of a slot for receiving a downlink control information (DCI) from a second cell of the cells 121, X is a slot offset for triggering the CSI-RS and L includes parameters associated with sub-carrier spaces (SCSs) of the first cell and the second cell. The UE 110 may transmit the CSI-RS in the specific slot.

In some embodiments, L is $$\left\lfloor \left( \frac{N^{CA}_{slot,offset,PDCCH}}{2^{\mu_{offset,PDCCH}}} - \frac{N^{CA}_{slot,offset,CSIRS}}{2^{\mu_{offset,CSIRS}}} \right) \cdot 2^{\mu_{CSIRS}} \right\rfloor$$

while $N^{CA}_{slot,offset,CSIRS}$ is a first carrier aggregation (CA) slot offset associated with the first cell for transmitting the CSI-RS, $N^{CA}_{slot,offset,PDCCH}$ is a second CA slot offset associated with the second cell for receiving the DCI, $\mu_{offset,CSIRS}$ is a first SCS index with maximum value among lowest configured SCSs of the plurality of cells, $\mu_{offset,PDCCH}$ is a second SCS index with maximum value among lowest configured SCSs of the plurality of cells and $\mu_{CSIRS}$ is an index of SCS of the first cell.

In some embodiments, $N^{CA}_{slot,offset,PDCCH}$ and $\mu_{offset,PDCCH}$ are determined by a higher-layer configuration (e.g., a radio resource control (RRC) configuration) for the second cell, and $N^{CA}_{slot,offset,CSIRS}$ and $\mu_{offset,CSIRS}$ are determined by a higher-layer configuration (e.g., an RRC configuration for the first cell. In some embodiments, the CSI-RS may include an aperiodic CSI-RS.

FIG. 3 illustrates one example of slots of the cells 121 with different SCSs in accordance with one novel aspect. In particular, after connecting to the cells 121, some specific cells of the cells 121 are determined. In this example, the cell 121a having SCS 120 kHz is primary cell (PCell), the cell 121b having SCS 30 kHz is for transmission of PDCCH and the cell 121c having SCS 30 kHz is for reception of CSI-RS. More specifically, it is determined that: (1) PDCCH is transmitted between the UE 110 and the cell 121b having SCS 30 kHz; and (2) CSI-RS is transmitted between the UE 110 and the cell 121c having SCS 30 kHz. The SCSs of the cells 121b and 121c are the same.

In this example, DCI is transmitted in slot '0' of the cell 121b. Slot offset for triggering the CSI-RS is configured as '0'.

A first CA slot offset of the cell 121b is determined as '3' based on a reference slot (i.e., slot '0') of the PCell 121a. More specifically, slot differences between slot '0' of the cell 121b and slot '0' of the PCell 121a are three slots of the PCell 121a. In other words, slot '0' of the cell 121b starts from slot '3' of the PCell 121a.

A second CA slot offset of the cell 121c is determined as '0' based on the reference slot (i.e., slot '0') of the PCell 121a. More specifically, there is no slot difference between slot '0' of the cell 121c and slot '0' of the PCell 121a. In other words, slot '0' of the cell 121c starts from slot '0' of the PCell 121a.

According to table 1 below, an SCS index of the PCell 121a is '3', an SCS index of the cell 121b is '1' and an SCS index of the cell 121c is '1'. The SCS index with maximum value is '3'. Therefore, $\mu_{offset,PDCCH}$ '3', $\mu_{offset,CSIRS}$ is '3' and the index of SCS of the cell 121c is '1' (i.e., $\mu_{CSIRS}$ is '1')

TABLE 1

| μ | Frequency |
|---|---|
| 0 | 15 kHz |
| 1 | 30 kHz |
| 2 | 60 kHz |
| 3 | 120 kHz |
| 4 | 240 kHz |

Therefore, based on the formula n+X+L, in this example, the index of the specific slot for receiving CSI-RS is $$0 + 0 + \left\lfloor \left( \frac{3}{2^3} - \frac{0}{2^3} \right) \cdot 2^1 \right\rfloor = 0.$$

Accordingly, the UE 110 may receive the CSI-RS in slot '0' of the cell 121c.

In some embodiments, after connecting to the cells 121, the UE 110 may receive a DCI from a first cell of the cells 121. The DCI may indicate the UE 110 to transmit a CSI reporting in an uplink slot n' in a second cell of the cells 121. Then, the UE 110 may determine a CSI reference resource for the CSI reporting according to a downlink slot (n-$n_{CSI\_ref}$). $n_{CSI\_ref}$ is an index of a slot for CSI reference (i.e., $n_{CSI\_ref}$ defined in 3GPP Technical Specification), and n is $$\left\lfloor n' \cdot \frac{2^{\mu_{DL}}}{2^{\mu_{UL}}} \right\rfloor + L$$

while $\mu_{DL}$ is an index of SCS of the first cell, $\mu_{UL}$ is an index of SCS of the second cell and L includes parameters associated with SCSs of the first cell and the second cell.

In some embodiments, when discontinuous reception (DRX) is configured in the network, the UE 110 may report a CSI report only if receiving at least one CSI-RS transmission occasion for channel measurement and CSI-RS and/or CSI-IM occasion for interference measurement in DRX active time no later than CSI reference resource and drops the report otherwise.

In some embodiments, L is $$\left\lfloor \left( \frac{N^{CA}_{slot,offset,UL}}{2^{\mu_{offset,UL}}} - \frac{N^{CA}_{slot,offset,DL}}{2^{\mu_{offset,DL}}} \right) \cdot 2^{\mu_{DL}} \right\rfloor$$

while $N_{slot,offset,DL}^{CA}$ is a first CA slot offset associated with the first cell for receiving the DCI, $N_{slot,offset,UL}^{CA}$ is a second CA slot offset associated with the second cell for transmitting the CSI reporting, $\mu_{offset,DL}$ is a first SCS index with maximum value among lowest configured SCSs of the plurality of cells, $\mu_{offset,UL}$ is a second SCS index with maximum value among lowest configured SCSs of the plurality of cells and $\mu_{DL}$ is an index of SCS of the first cell.

In some embodiments, $N_{slot,offset,DL}^{CA}$ and $\mu_{offset,DL}$ are determined by a higher-layer configuration for the first cell, and $N_{slot,offset,UL}^{CA}$ and $\mu_{offset,UL}$ are determined by a higher-layer configuration for the second cell.

Figure 4:
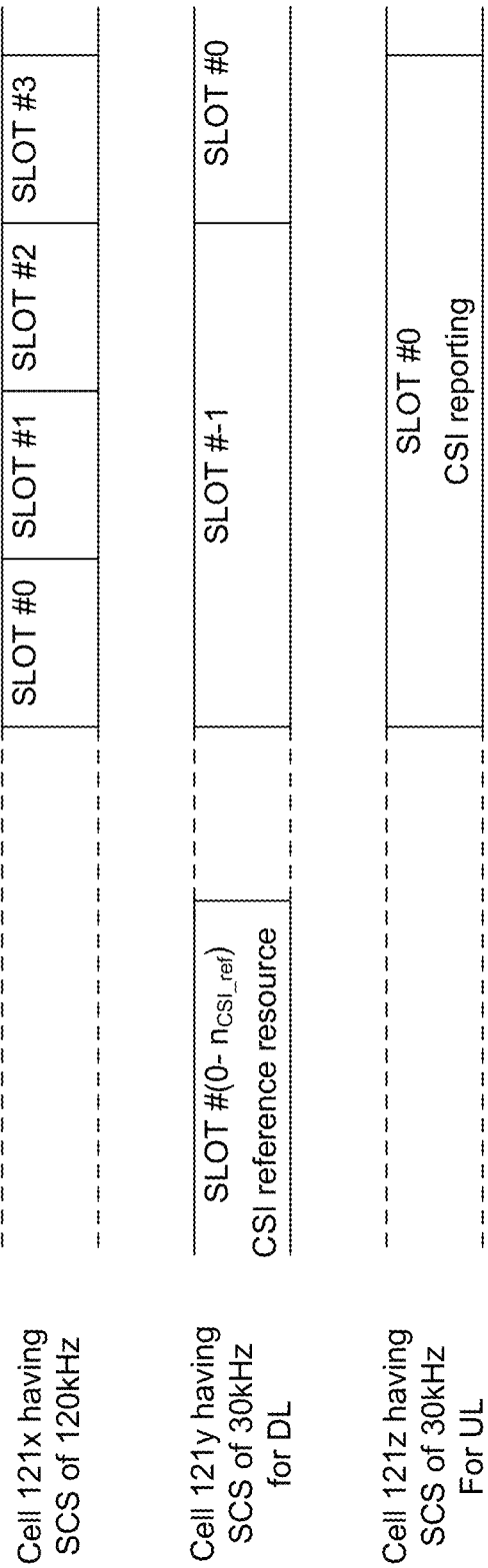
FIG. 4 illustrates one example of slots of the cells with different SCSs in accordance with embodiments of the current invention.

FIG. 4 illustrates one example of slots of the cells 121 with different SCSs in accordance with one novel aspect. In particular, after connecting to the cells 121, some specific cells of the cells 121 are determined. In this example, the cell 121*x* having SCS 120 kHz is PCell, the cell 121*y* having SCS 30 kHz is for downlink PDCCH transmission and the cell 121*z* having SCS 30 kHz is for uplink CSI reporting transmission.

In this example, a first CA slot offset of the cell 121*y* is determined as '3' based on a reference slot (i.e., slot '0') of the PCell 121*x*. More specifically, slot differences between slot '0' of the cell 121*y* and slot '0' of the PCell 121*x* are three slots of the PCell 121*x*. In other words, slot '0' of the cell 121*y* starts from slot '3' of the PCell 121*x*.

A second CA slot offset of the cell 121*z* is determined as '0' based on the reference slot (i.e., slot '0') of the PCell 121*x*. More specifically, there is no slot difference between slot '0' of the cell 121*z* and slot '0' of the PCell 121*x*. In other words, slot '0' of the cell 121*z* starts from slot '0' of the PCell 121*x*.

According to table 1, an SCS index of the PCell 121*x* is '3', an SCS index of the cell 121*y* is '1' and an SCS index of the cell 121*z* is '1'. The SCS index with maximum value is '3'. Therefore, $\mu_{offset,DL}$ '3', $\mu_{offset,UL}$ '3' and an index of SCS of the cell 121*y* is '1' (i.e., $\mu_{DL}$ is '1').

In this example, the DCI indicates the UE 110 to transmit CSI reporting in the cell 121*z*. Therefore, in the time domain, the CSI reference resource for a CSI reporting in uplink slot '0' (i.e., n'=0) is defined by a single downlink slot n-$n_{CSI\_ref}$, where n is $$\left\lfloor 0 \cdot \frac{2^3}{2^3} \right\rfloor + \left\lfloor \left( \frac{0}{2^3} - \frac{3}{2^3} \right) \cdot 2^1 \right\rfloor = 0.$$

The UE 110 determines slot of the CSI reference resource according to the downlink slot '0-$n_{CSI\_ref}$' of the cell 121*y*.

Figure 5:
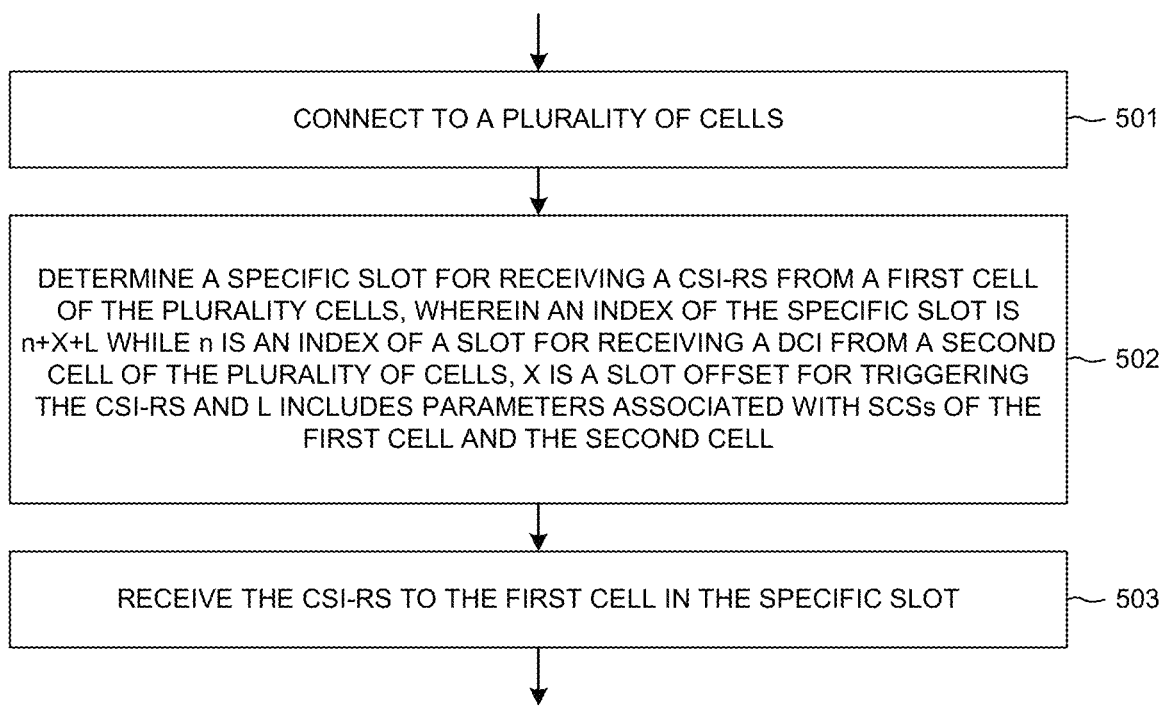
FIG. 5 is a flow chart of a method of scheduling with multiple cells in accordance with embodiments of the current invention.

FIG. 5 is a flow chart of a method of scheduling with multiple cells from UE perspective in a 5G/NR network in accordance with one novel aspect. In step 501, a UE connects to a plurality of cells in a network. In step 502, the UE determines a specific slot for receiving a CSI-RS from a first cell of the plurality cells. An index of the specific slot is n+X+L while n is an index of a slot for receiving a DCI from a second cell of the plurality of cells, X is a slot offset for triggering the CSI-RS and L includes parameters associated with SCSs of the first cell and the second cell. In step 503, the UE receives the CSI-RS from the first cell in the specific slot.

In some embodiments, L is $$\left\lfloor \left( \frac{N^{CA}_{slot,offset,PDCCH}}{2^{\mu_{offset,PDCCH}}} - \frac{N^{CA}_{slot,offset,CSIRS}}{2^{\mu_{offset,CSIRS}}} \right) \cdot 2^{\mu_{CSIRS}} \right\rfloor$$

while $N_{slot,offset,CSIRS}^{CA}$ is a first carrier aggregation (CA) slot offset associated with the first cell for transmitting the CSI-RS, $N_{slot,offset,PDCCH}^{CA}$ is a second CA slot offset associated with the second cell for receiving the DCI, $\mu_{offset,CSIRS}$ is a first SCS index with maximum value among lowest configured SCSs of the plurality of cells, $\mu_{offset,PDCCH}$ is a second SCS index with maximum value among lowest configured SCSs of the plurality of cells and $\mu_{CSIRS}$ is an index of SCS of the first cell.

In some embodiments, the first CA slot offset and the second CA slot offset are determined based on a reference slot of a primary cell of the plurality of cells.

In some embodiments, the first index of SCS of offset and the second index of SCS of offset are determined based an RRC configuration.

In some embodiments, $N_{slot,offset,PDCCH}^{CA}$ and $\mu_{offset,PDCCH}$ are determined by a higher-layer configuration for the second cell, and $N_{slot,offset,CSIRS}^{CA}$ and $\mu_{offset,CSIRS}$ are determined by a higher-layer configuration for the first cell.

In some embodiments, the CSI-RS includes an aperiodic CSI-RS. In some embodiments, the SCSs of the first cell and the second cell are the same.

Figure 6:
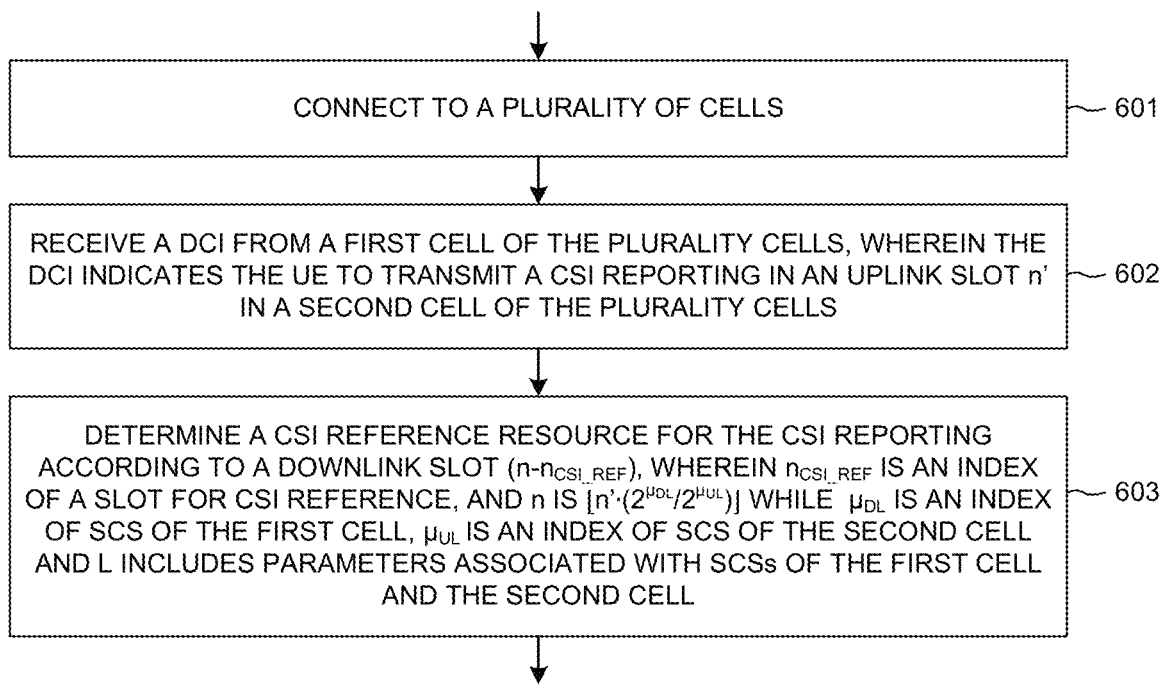
FIG. 6 is a flow chart of a method of scheduling with multiple cells in accordance with embodiments of the current invention.

FIG. 6 is a flow chart of a method of scheduling with multiple cells from UE perspective in a 5G/NR network in accordance with one novel aspect. In step 601, a UE connects to a plurality of cells in a network. In step 602, the UE receives a DCI from a first cell of the plurality cells. The DCI indicates the UE to transmit a CSI reporting in an uplink slot n' in a second cell of the plurality of cells. In step 603, the UE determines a CSI reference resource for the CSI reporting according to a downlink slot (n-$n_{CSI\_ref}$). $n_{CSI\_ref}$ is an index of a slot for CSI reference, and n is $$\left\lfloor n' \cdot \frac{2^{\mu_{DL}}}{2^{\mu_{UL}}} \right\rfloor + L$$

while $\mu_{DL}$ is an index of SCS of the first cell, $\mu_{UL}$ is an index of SCS of the second cell and L includes parameters associated with SCSs of the first cell and the second cell.

In some embodiments, L is $$\left\lfloor \left( \frac{N^{CA}_{slot,offset,UL}}{2^{\mu_{offset,UL}}} - \frac{N^{CA}_{slot,offset,DL}}{2^{\mu_{offset,DL}}} \right) \cdot 2^{\mu_{DL}} \right\rfloor$$

while $N_{slot,offset,DL}^{CA}$ is a first CA slot offset associated with the first cell for receiving the DCI, $N_{slot,offset,UL}^{CA}$ is a second CA slot offset associated with the second cell for transmitting the CSI reporting, $\mu_{offset,DL}$ is a first SCS index with maximum value among lowest configured SCSs of the plurality of cells, $\mu_{offset,UL}$ is a second SCS index with maximum value among lowest configured SCSs of the plurality of cells and $\mu_{DL}$ is an index of SCS of the first cell.

In some embodiments, $N_{slot,offset,DL}^{CA}$ and $\mu_{offset,DL}$ are determined by a higher-layer configuration for the first cell, and $N_{slot,offset,UL}^{CA}$ and $\mu_{offset,UL}$ are determined by a higher-layer configuration for the second cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   connecting, by a user equipment (UE), to a plurality of cells in a network;
   determining, by the UE, a specific slot for receiving a channel state information reference signal (CSI-RS) from a first cell of the plurality cells, wherein an index of the specific slot is n+X+L, where n is an index of a slot for receiving a downlink control information (DCI) from a second cell of the plurality of cells, X is a slot offset for triggering the CSI-RS and L includes parameters associated with sub-carrier spacings (SCSs) of the first cell and the second cell, wherein L is $$\left\lfloor \left( \frac{N_{slot,offset,PDCCH}^{CA}}{2^{\mu_{offset,PDCCH}}} - \frac{N_{slot,offset,CSIRS}^{CA}}{2^{\mu_{offset,CSIRS}}} \right) \cdot 2^{\mu_{CSIRS}} \right\rfloor$$

while $N_{slot,offset,CSIRS}^{CA}$ is a first carrier aggregation (CA) slot offset associated with the first cell for transmitting the CSI-RS, $N_{slot,offset,PDCCH}^{CA}$ is a second CA slot offset associated with the second cell for receiving the DCI, $\mu_{offset,CSIRS}$ is a first SCS index with maximum value among lowest configured SCSs of the plurality of cells, $\mu_{offset,PDCCH}$ is a second SCS index with maximum value among lowest configured SCSs of the plurality of cells and $\mu_{CSIRS}$ is an index of SCS of the first cell; and
   receiving, by the UE, the CSI-RS from the first cell in the specific slot.

2. The method of claim 1, wherein the first CA slot offset and the second CA slot offset are determined based on a radio resource control (RRC) configuration of the plurality of cells.

3. The method of claim 1, wherein the first index of SCS of offset and the second index of SCS of offset are determined based on a radio resource control (RRC) configuration.

4. The method of claim 1, wherein $N_{slot,offset,PDCCH}^{CA}$ and $\mu_{offset,PDCCH}$ are determined by a higher-layer configuration for the second cell, and $N_{slot,offset,CSIRS}^{CA}$ and $\mu_{offset,CSIRS}$ are determined by a higher-layer configuration for the first cell.

5. The method of claim 1, wherein the CSI-RS includes an aperiodic CSI-RS.

6. The method of claim 1, wherein the SCSs of the first cell and the second cell are the same.

7. A method, comprising:
   connecting, by a user equipment (UE), to a plurality of cells in a network; and
   receiving, by the UE, a downlink control information (DCI) from a first cell of the plurality cells, wherein the DCI indicates the UE to transmit a channel state information (CSI) reporting in an uplink slot n' in a second cell of the plurality cells; and
   determining, by the UE, a CSI reference resource for the CSI reporting according to a downlink slot (n-$n_{CSI\_ref}$), wherein $n_{CSI\_ref}$ is an index of a slot for CSI reference, and n is $$\left\lfloor n' \cdot \frac{2^{\mu_{DL}}}{2^{\mu_{UL}}} \right\rfloor + L$$

while $\mu_{DL}$ is an index of sub-carrier spacing (SCS) of the first cell, $\mu_{UL}$ is an index of SCS of the second cell and L includes parameters associated with SCSs of the first cell and the second cell, wherein L is $$\left\lfloor \left( \frac{N_{slot,offset,UL}^{CA}}{2^{\mu_{offset,UL}}} - \frac{N_{slot,offset,DL}^{CA}}{2^{\mu_{offset,DL}}} \right) \cdot 2^{\mu_{DL}} \right\rfloor$$

while $N_{slot,offset,DL}^{CA}$ is a first carrier aggregation (CA) slot offset associated with the first cell for receiving the DCI, $N_{slot,offset,UL}^{CA}$ is a second CA slot offset associated with the second cell for transmitting the CSI reporting, $\mu_{offset,DL}$ is a first SCS index with maximum value among lowest configured SCSs of the plurality of cells, $\mu_{offset,UL}$ is a second SCS index with maximum value among lowest configured SCSs of the plurality of cells and up is an index of SCS of the first cell.

8. The method of claim 7, wherein $N_{slot,offset,DL}^{CA}$ and $\mu_{offset,DL}$ are determined by a higher-layer configuration for the first cell, and $N_{slot,offset,UL}^{CA}$ and $\mu_{offset,UL}$ are determined by a higher-layer configuration for the second cell.

9. A user equipment (UE) comprising:
   a transceiver that:
      connects to a plurality of cells in a network;
   a scheduling circuit that:
      determines a specific slot for receiving a channel state information reference signal (CSI-RS) from a first cell of the plurality cells, wherein an index of the specific slot is n+X+L, where n is an index of a slot for receiving a downlink control information (DCI) from a second cell of the plurality of cells, X is a slot offset for triggering the CSI-RS and L includes parameters associated with sub-carrier spacings (SCSs) of the first cell and the second cell, wherein L is $$\left\lfloor \left( \frac{N_{slot,offset,PDCCH}^{CA}}{2^{\mu_{offset,PDCCH}}} - \frac{N_{slot,offset,CSIRS}^{CA}}{2^{\mu_{offset,CSIRS}}} \right) \cdot 2^{\mu_{CSIRS}} \right\rfloor$$

while $N_{slot,offset,CSIRS}^{CA}$ is a first carrier aggregation (CA) slot offset associated with the first cell for transmitting the CSI-RS, $N_{slot,offset,PDCCH}^{CA}$ is a second CA slot offset associated with the second cell for receiving the DCI, $\mu_{offset,CSIRS}$ is a first SCS index with maximum value among lowest configured SCSs of the plurality of cells, $\mu_{offset,PDCCH}$ is a second SCS index with maximum value among lowest configured SCSs of the plurality of cells and $\mu_{CSIRS}$ is an index of SCS of the first cell; and receives, by the transceiver, the CSI-RS from the first cell in the specific slot.

10. The UE of claim 9, wherein the first CA slot offset and the second CA slot offset are determined based on a radio resource control (RRC) configuration of the plurality of cells.

11. The UE of claim 9, wherein the first index offset and the second index offset are determined based on a radio resource control (RRC) configuration.

12. The UE of claim 9, wherein $N_{slot,offset,PDCCH}^{CA}$ and $\mu_{offset,PDCCH}$ are determined by a higher-layer configuration for the second cell, and $N_{slot,offset,CSIRS}^{CA}$ and $\mu_{offset,CSIRS}$ are determined by a higher-layer configuration for the first cell.

13. The UE of claim 9, wherein the CSI-RS includes an aperiodic CSI-RS.

14. The UE of claim 9, wherein the SCSs of the first cell and the second cell are the same.

15. A user equipment (UE) comprising:
a transceiver that:
connects to a plurality of cells in a network; and
receives a downlink control information (DCI) from a first cell of the plurality of cells, wherein the DCI indicates the UE to transmit a channel state information (CSI) reporting in an uplink slot n' in a second cell;
a scheduling circuit that:
determines a CSI reference resource for the CSI reporting according to a downlink slot (n-$n_{CSI\_ref}$), wherein $n_{CSI\_ref}$ is an index of a slot for CSI reference, and n is $$\left\lfloor n' \cdot \frac{2^{\mu_{DL}}}{2^{\mu_{UL}}} \right\rfloor + L$$

while $\mu_{DL}$ is an index of sub-carrier spacings (SCS) of the first cell, $\mu_{UL}$ is an index of SCS of the second cell and L includes parameters associated with SCSs of the first cell and the second cell, wherein L is $$\left\lfloor \left( \frac{N_{slot,offset,UL}^{CA}}{2^{\mu_{offset,UL}}} - \frac{N_{slot,offset,DL}^{CA}}{2^{\mu_{offset,DL}}} \right) \cdot 2^{\mu_{DL}} \right\rfloor$$

while $N_{slot,offset,DL}^{CA}$ is a first carrier aggregation (CA) slot offset associated with the first cell for receiving the DCI, $N_{slot,offset,UL}^{CA}$ is a second CA slot offset associated with the second cell for transmitting the CSI reporting, $\mu_{offset,DL}$ is a first SCS index with maximum value among lowest configured SCSs of the plurality of cells, $\mu_{offset,UL}$ is a second SCS index with maximum value among lowest configured SCSs of the plurality of cells and $\mu_{DL}$ is an index of SCS of the first cell.

16. The UE of claim 15, wherein $N_{slot,offset,DL}^{CA}$ and $\mu_{offset,DL}$ are determined by a higher-layer configuration for the first cell, and $N_{slot,offset,UL}^{CA}$ and $\mu_{offset,UL}$ are determined by a higher-layer configuration for the second cell.

* * * * *